Oct. 26, 1965    J. F. SWIFT ETAL    3,213,621
EXTERNAL OPERATING CONTROL MEANS FOR A HYDRAULIC TRANSMISSION
Filed Sept. 8, 1964    4 Sheets-Sheet 1
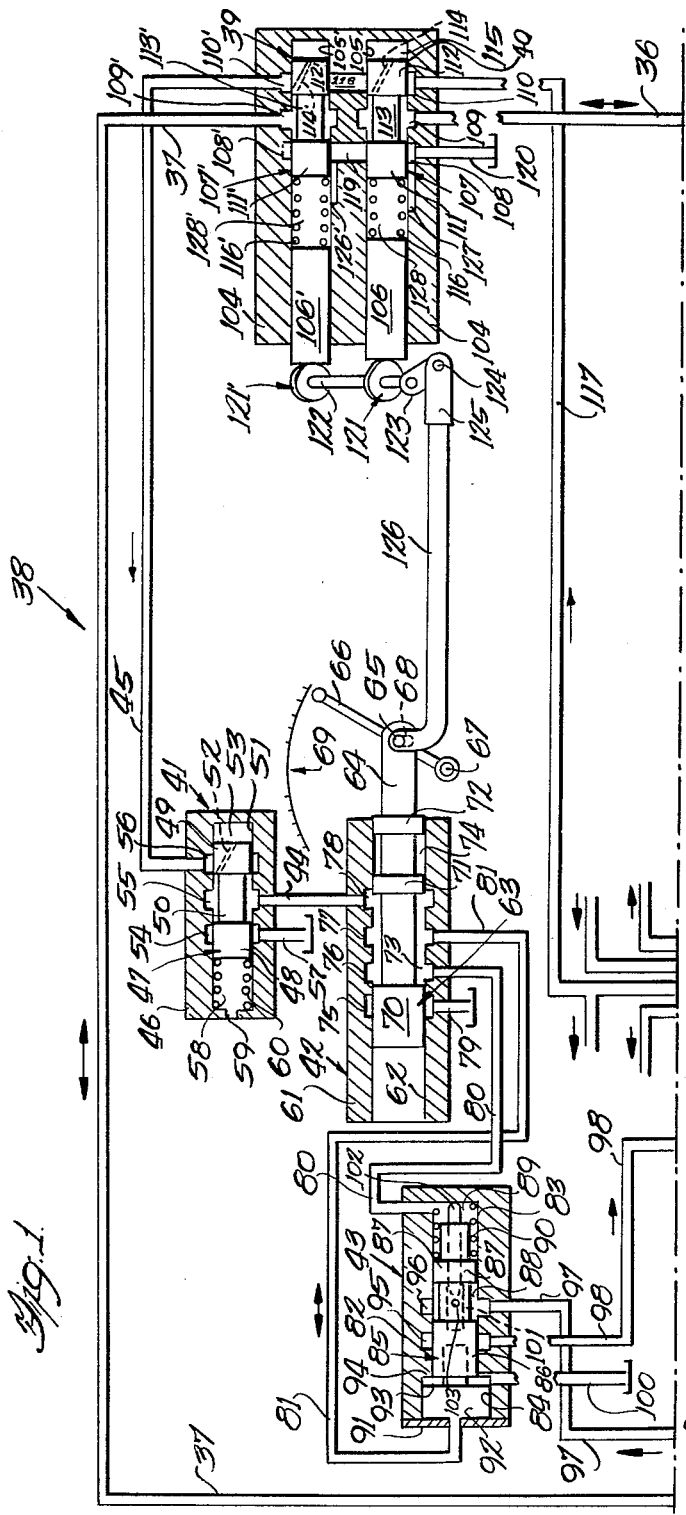

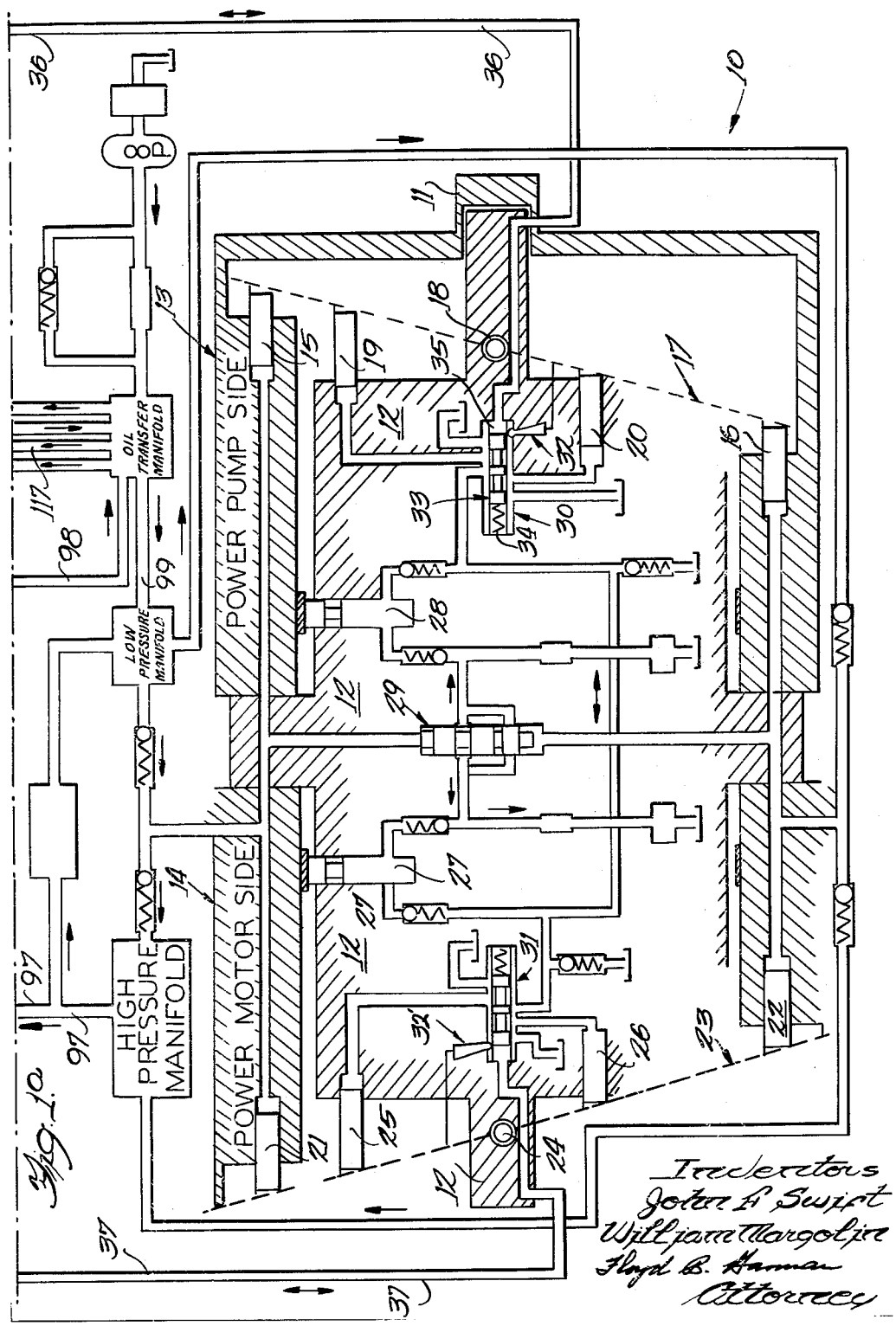

Oct. 26, 1965    J. F. SWIFT ETAL    3,213,621
EXTERNAL OPERATING CONTROL MEANS FOR A HYDRAULIC TRANSMISSION
Filed Sept. 8, 1964    4 Sheets-Sheet 3
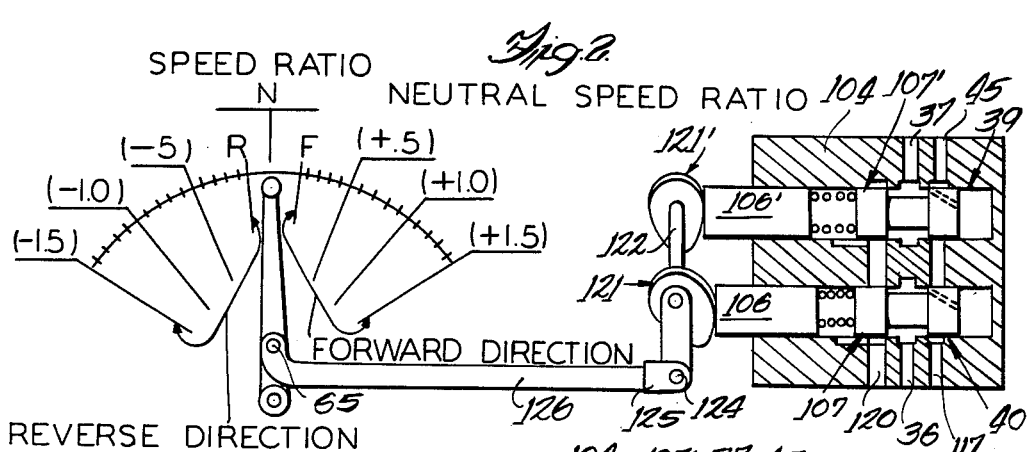
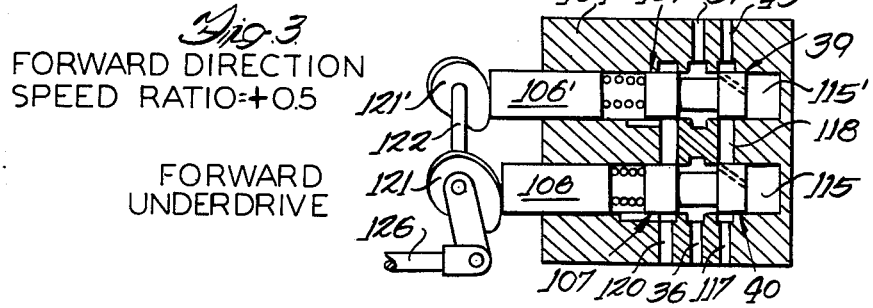
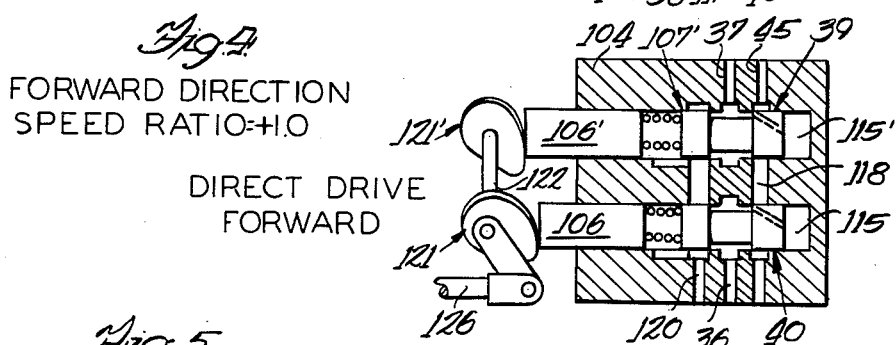
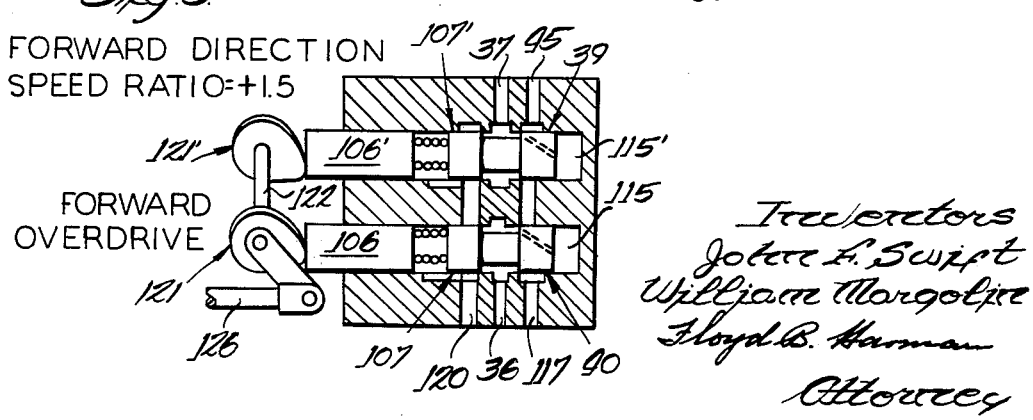

REVERSE DIRECTION
SPEED RATIO=-0.5

REVERSE
UNDERDRIVE

REVERSE DIRECTION
SPEED RATIO=-1.0

DIRECT DRIVE
IN REVERSE

REVERSE DIRECTION
SPEED RATIO=-1.5

REVERSE
OVERDRIVE

United States Patent Office 3,213,621
Patented Oct. 26, 1965

3,213,621
EXTERNAL OPERATING CONTROL MEANS FOR A HYDRAULIC TRANSMISSION
John F. Swift and William Margolin, Chicago, Ill., assignors to International Harvester Company, Chicago, Ill., a corporation of New Jersey
Filed Sept. 8, 1964, Ser. No. 394,859
12 Claims. (Cl. 60—53)

This invention relates to a fluid pressure control system. More in particular, this invention relates to a fluid control system for regulating selectively the fluid pressure values in a plurality of fluid lines in correlated relation. Still, more in particular, this invention relates to a fluid pressure control system for a fluid power transmission device.

In a hydrostatic power transmission device comprising a pump hydraulically connected to one or more hydraulic motors, the speed ratio between the rotative power input to the pump and the rotative power output from the motor depends upon the relative fluid displacement of the pump with respect to the motor. Therefore it becomes apparent that if the hydrostatic power transmission is of the conventional infinitely variable speed ratio type then at least one of the pump and motor units must necessarily be of the variable fluid displacement type. In the case where the pumps and motors employed are of the swash plate type, the displacement of the pump and/or motor may be varied by controlling the degree of angular displacement of the associated swash plate as is well known. Frequently, the angular displacements of such swash plates are controlled by hydraulic rams.

A hydrostatic power transmission device differs from a hydromechanical power transmission in at least one major respect. The former device is entirely dependent upon the movement of fluid under pressure whereas the latter device divides the power train into two paths, partly mechanical and the balance hydrostatic. Further in the hydromechanical transmission the power train is entirely mechanical when the input and output shafts rotate in the same direction at equal speed (direct drive) for, in such instance, the hydraulic system is under hydraulic lock. An example of a hydromechanical power transmission device to which the present invention may be used is shown in the copending application of John F. Swift, Serial No. 209,149, filed on July 11, 1962, now Patent No. 3,157,995, issued on November 24, 1964, and assigned to the same assignee herein.

As stated above the speed ratio of swash plate type hydrostatic and hydromechanical power transmissions is controlled by varying the angular displacement of one or more swash plates under the influence of hydraulic rams. It is a prime object of the present invention to provide an external remote control means for varying selectively the speed ratio of hydrostatic and hydromechanical power transmission devices.

A further important object of the present invention is to provide external control means for controlling the speed ratios of hydrostatic and hydromechanical power transmissions of the swash plate type wherein the transmission is used in the power train for propelling a vehicle.

Another important object of the present invention is to provide a control means according to the preceding objects wherein the high pressure side and the low pressure side of the working circuit of the transmission are communicatively connected together when the control means is in neutral position thus ensuring that no power is transmitted from the transmission's input shaft to its output shaft.

A still further object of the present invention is to provide a control means according to the preceding object wherein additional means are provided for limiting the maximum torque delivered to the output shaft of the transmission for both directions of rotation.

These and other desirable objects inherent in and encompassed by the invention will become more apparent from the ensuring description of a preferred embodiment, the appended claims, and the annexed drawing wherein:

FIGURE 1 is a diagrammatic sectional view of the arrangement of the components comprising the control system of the present invention;

FIGURE 1A is a schematic view of a hydromechanical power transmission described in detail in our copending application for patent Serial No. 384,472, filed on July 22, 1964. The conduits at the bottom of FIGURE 1 correspond with the top conduits of FIGURE 1A so that FIGURES 1 and 1A taken compositely illustrate diagrammatically a complete control system for a hydromechanical transmission according to this invention;

FIGURE 2 illustrates the condition of the pressure regulator valves when the control lever of the control system is in neutral position;

FIGURES 3–8 illustrate various conditions of operation of the pressure regulator valves for various positions of the control lever of FIGURE 2 wherein the transmission of FIGURE 1A is delivering power to the output shaft at various speed ratios corresponding to the position of the control lever.

Figure 6:
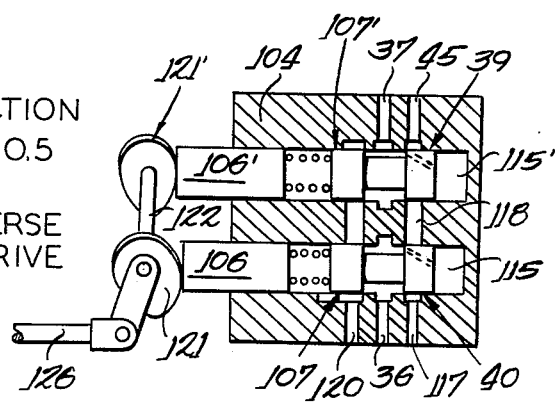

It is deemed necessary to discuss briefly an example of a hydromechanical power transmission device which is suitable for remote control by the invention herein. Referring to FIGURE 1A there is shown a schematic diagram of the hydromechanical transmission 10 disclosed in our aforementioned copending application. The transmission 10 includes an input shaft 11 and an output shaft 12. The input shaft 11 is driven by a prime mover such as an internal combustion engine (not shown). The input shaft 11 drives a power pump, indicated generally at 13, which is hydraulically interconnected with a power motor 14 in a known manner wherein power is transmitted hydromechanically from the input shaft 11 to the output shaft 12. The power pump 13 includes a plurality of peripherally disposed power pump cylinders, two of which are indicated at 15 and 16, constrained for rotation with the input shaft 11. The power pump 13 is associated with a pump swash plate, indicated generally at 17, which swash plate is pivotally mounted at 18 on the output shaft 12. Disposed within the output shaft 12 is a pair of pump swash plate displacement control rams 19 and 20 positioned in 180° relation as shown. Thus it is apparent that by appropriate control of the rams 19 and 20 the angular displacement of the pump swash plate 17 may be regulated selectively and thus the fluid displacement of the power pump 13 is regulated correspondingly.

The power motor 14 includes a plurality of peripherally disposed power motor cylinders, two of which are indicated at 21 and 22, which are stationary with respect to the transmission's outer housing (not shown). The power motor 14 is associated with a motor swash plate, indicated generally at 23, which is pivotally mounted at 24 on the output shaft 12. Disposed within the output shaft 12 is a pair of motor swash plate displacement control rams 25 and 26 positioned in 180° relation as shown. Thus it is apparent that by appropriate control of the rams 25 and 26 the angular displacement of the motor swash plate 23 may be regulated selectively and thus the fluid displacement of the power motor 14 is regulated correspondingly.

Although the source of fluid under pressure for energizing the swash plate control rams 19, 20, 25 and 26 may be taken from the high pressure side of the transmission's working circuit (fluid pressure emanating from the power pump cylinders 15 and 16), the present embodiment of the transmission 10 provides a separate source independent of the working circuit. For this purpose a pair of high pressure low volumetric capacity control piston pumps 27 and 28 are disposed in the output shaft 12. The inlet sides of the piston pumps 27, 28 are communicatively connected to the low pressure side of the transmission's working circuit through a pressure actuated shuttle valve indicated generally at 29. The shuttle valve 29 is actuated by the high pressure side of the working circuit so that the control pumps 27, 28 always draw hydraulic fluid from the low pressure side of the working circuit.

The outlet sides of the control pumps 27, 28 are connected together in parallel relation so that the outputs of both pumps 27, 28 are combined. The output sides of the pumps 27, 28 communicatively connect with a power pump swash plate displacement control valve, indicated generally at 30, and a power motor swash plate displacement control valve, indicated generally at 31.

The pump displacement control valve 30 is provided with follow-up means 32 so that if the angular displacement of the pump swash plate 17 creeps through fluid leakage in rams 19 and 20, the control valve 30 is actuated whereby the rams 19 and 20 are energized in a corrective direction. The follow-up means 32' associated with the motor swash plate displacement control valve 31 and the motor swash plate 23 functions in a similar manner as that described for the pump control valve 30.

The pump swash plate control valve 30 includes a valve spool 33 which is urged rightwardly, as viewed in FIGURE 1A, by compression spring 34. In the rightward end portion of the control valve 30 is a fluid chamber 35. Thus as the fluid pressure is increased in the chamber 35, the valve spool 33 is moved leftwardly against the force of compression spring 34. From this it will be apparent that the axial position of the valve spool 33 is a direct function of the pump swash plate control signal pressure in the chamber 35 which chamber is in communication with the conduit 36. It is sufficient to say for purposes herein that the axial position of the valve spool 33 is directly related to the angular displacement of the pump swash plate 17. Thus it is apparent that the value of the pump signal pressure in conduit 36 determines the angular displacement of the pump swash plate 17 and the fluid displacement of the power pump 13. The motor swash plate control signal pressure in conduit 37 operates the motor control valve 31 for controlling the angular displacement of the motor swash plate 23 and the fluid displacement of the power motor 14 in the same manner and hence will not be repeated here. It should be observed that both swash plates 17 and 23 may be angularly displaced selectively, each may be independently controlled with respect to each other merely by altering selectively the signal pressure values in conduits 36, 37. It will be noted that the signal pressure in conduits 36, 37 are essentialy static as a slight fluid flow occurs only when it is desired to alter the displacement of the pump and motor, respectively. The advantages and speed ratio characteristics of a hydromechanical transmission having both pump motor swash plates independently variable are fully discussed in the copending application to John F. Swift, Serial No. 173,392 filed on February 15, 1962, now Patent No. 3,151,456 issued on October 6, 1964, and assigned to the assignee herein.

From the foregoing it will be apparent that the speed ratio of the transmission 10 may be selectively controlled by suitable control of the motor signal pressure value in conduit 37 and the pump signal pressure value in the conduit 36. The crux of the present invention is a novel means to control the signal pressure values, such as in conduits 36 and 37, in a coordinated relation with respect to each other.

Referring to FIGURE 1 the numeral 38 indicates generally the coordinated fluid pressure control system of this invention. The system 38 includes a motor signal pressure regulator 39, a pump signal pressure regulator 40, a control pressure regulator 41, a selector valve 42, and a pressure actuated bypass valve 43. The control pressure regulator 41 will now be described.

The object of the control pressure regulator 41 is to deliver a source of fluid at a predetermined fixed pressure (e.g. 80 p.s.i.) from another higher pressure source (e.g. 100 p.s.i.) which may fluctuate. For example, hydromechanical transmissions such as that shown in FIGURE 1A are provided with a charge pump P usually driven by the input shaft 11 for replenishing fluid losses in the working circuit and forced lubrication of bearings. It also serves to prevent fluid cavitation in the transmission's working circuit particularly when operated at higher speeds. For such purposes the charge pump P is usually adapted for delivery of hydraulic fluid at 100–200 p.s.i. pressure range and draws its inlet fluid from the transmission's sump. In the particular embodiment shown of the system 38 the control pressure regulator 41 serves to deliver fluid pressure into conduit 44 at a fixed value of 80 p.s.i., from the inlet pressure of 100–200 p.s.i. from the charge pump P, through conduit 45.

The regulator 41 comprises a casing 46 having a valve spool 47 slidable in a longitudinal bore 51 therein as indicated in FIGURE 1. The valve spool 47 includes lands 48 and 49 with a circumferential groove 50 therebetween. Within the land 49 of the valve spool 47 is a passage 52, shown in dotted lines, which communicates the circumferential groove 50 with a chamber 53 formed by the land 49, longitudinal bore 51 and the casing 46. The casing 46 is also provided with three annular grooves 54, 55 and 56 as shown. The annular groove 54 communicates in drain relation through conduit 57 to the common sump from which the charge pump P draws its fluid. Annular groove 55 communicates with the outlet delivery conduit 44 and annular groove 56 communicates with the source of inlet fluid pressure in conduit 45. Within the longitudinal bore 51 positioned leftwardly of the valve spool 47 is a chamber 58 vented through a passage 59 in the casing 46. Within the chamber 58 is disposed a compression spring 60 which urges the valve spool 47 in a rightward direction as viewed in FIGURE 1. Since the fluid pressure in the chamber 53 is equal to the fluid pressure in the circumferential groove 50, it will be evident that fluid pressure in the chamber 53 urges the valve spool 47 leftwardly against the compressive force of the spring 60. When the pressure in conduit 44 drops below the predetermined fixed value, there is a corresponding pressure drop in the chamber 53 which allows the spring 60 to move the valve spool 47 rightwardly whereby land 49 moves out of register with annular groove 56 thus allowing fluid to enter the circumferential groove 50 from the conduit 45. As the fluid from conduit 45 enters the circumferential groove 50 (and thus into conduit 44), fluid also moves through passage 52 into the chamber 53 which increases the pressure value in the chamber 53. The increased pressure in chamber 53 moves the valve spool 47 leftwardly until the land 49 again registers with the annular groove 56 at which time the pressure in conduit 44 is equal to the predetermined fixed value and the valve spool 47 terminates movement. Should for any reason the pressure in the conduit 44 increase above the predetermined fixed value, the pressure in the chamber 53 correspondingly rises and the piston action of the pressure against the valve spool 47 moves it leftwardly until the land 48 moves out of register with the annular groove 54. This permits the excessive pressure to bleed out into the sump through circumferential groove 50 and annular groove 54.

From the above it will be seen that the compression characteristics of the spring 60 should be chosen appropriately so that the predetermined pressure value in the conduit 44 is attained. The selector valve 42 will now be described.

Referring again to FIGURE 1 the selector valve 42 includes a casing 61 having a longitudinal bore 62 with a valve spool, indicated generally at 63, slidably disposed therein. The valve spool 63 includes a projection 64 the outer end portion of which is pivotally connected at 65 in operative relation with an operating control lever 66 as shown. The lever 66 is supported pivotally at 67 to a stationary support (not shown). The projection 64 of the valve spool 63 is provided with an elongated hole, shown in dotted lines at 68, to accommodate the arcuate movement of the lever 66. The lever 66 is associated with a stationary dial 69 correlated with the operating speed ratio of the power transmission 10. In the position shown in FIGURE 1 the dial 69 indicates that the speed ratio of the transmission is set at the maximum (overdrive) in forward direction. The term "forward direction" as used herein means that the output shaft 12 of the transmission 10 is rotating in the same direction as that of the input shaft 11 and, conversely, the term "reverse direction" as used herein means that the output shaft 12 is rotating in the opposite direction with respect to the direction of rotation of the input shaft 11.

The valve spool 63 of the selector valve 42 includes lands 70, 71 and 72 and circumferential grooves 73 and 74 as shown in FIGURE 1. The casing 61 of the selector valve 42 is provided with annular grooves 75, 76, 77 and 78 as shown. Annular groove 75 is communicatively connected through conduit 79 to drain preferably to the sump from which the charge pump P draws its inlet fluid. Annular groove 76 communicates with a first outlet leading to the conduit 80 and the annular groove 77 communicates with a second outlet leading to the conduit 81 as shown. Lastly, the annular groove 78 communicates with conduit 44 which is the fluid inlet conduit to the selector valve 42 leading from the outlet of the control pressure regulator 41 previously described.

The selector valve 42 performs three basic functions. First, when the control lever 66 is positioned within the range where the transmission 10 is operating in a forward direction speed ratio, the selector valve 42 communicates the inlet conduit 44 with both of the first and second outlet conduits 80 and 81. In this condition the annular grooves 76, 77 and 78 are in registry with the circumferential groove 73 and thus the conduits 80 and 81 are under fluid pressure at the value determined by the previously described pressure regulator 41. However the drain conduit 79 is closed as the land 70 is in registry with the annular groove 75. Second, when the lever 66 is positioned within the range where the transmission 10 is in neutral (i.e. output shaft 12 not in driven relation with the input shaft 11), the selector valve 42 communicates the drain conduit 79 with both of the first and second outlet conduits 80 and 81. In this condition the annular grooves 75, 76 and 77 are in registry with the circumferential groove 73 and thus the conduits 80 and 81 are in communication with drain. Fluid flow through the inlet conduit 44 is blocked by the land 71 or circumferential groove 74 which is closed in this condition. Third, when the control lever 66 is positioned within the range where the transmission 10 is operating in a reverse direction speed ratio, the selector valve 42 communicates the inlet conduit 44 with the second outlet conduit 81. During this condition the circumferential groove 74 is in registry with annular grooves 77 and 78 only and circumferential groove 73 is in registry with the annular grooves 75 and 76. Thus in this condition the first outlet conduit 80 communicates with the drain conduit 79 while the second outlet conduit 81 communicates with the inlet conduit 44 which pressurizes conduit 81.

The primary function of the pressure actuated bypass valve 43 is to interconnect communicatively in bypass relation the high pressure side and the low pressure side of the working circuit of the transmission 10 when the control lever 11 is in the neutral range. In such condition the transmission 10 will not transmit power from the input shaft 11 to the output shaft 12 irrespective of the angular displacements of the swash plates 17 and 23 because the working circuit of the transmission is short circuited.

The pressure actuated bypass valve 43 includes a casing 82 having a small longitudinal bore 83 and a large longitudinal bore 84 disposed in coextensive relation as shown in FIGURE 1. Within the bore 83 in slidable relation is a valve spool indicated generally at 85. The valve spool 85 is provided with lands 86 and 87 with a circumferential groove 88 therebetween. The rightward end portion of the valve spool 85 forms a chamber 89 with the casing 82. Within the chamber 89 is a compression spring 90 which urges the plunger 85 in the leftward direction. Also, the chamber 89 communicates with the first outlet of the selector valve, previously described, through the conduit 80.

The leftward end of the casing 82 is provided with a cover 91 rigidly connected thereto in sealed relation forming a second chamber 92. As will be seen from FIGURE 1, the second chamber 92 communicates with the second outlet of the selector valve 42 through the conduit 81. Disposed within the chamber 92 in slidable relation is a piston 93 connected rigidly with and forming a part of the valve spool 85. Thus, it will be apparent from FIGURE 1 that when the chamber 92 is pressurized (e.g. 80 p.s.i.) the piston 93 drives the valve spool 85 rightwardly against the urging of the spring 90 to the position illustrated, the rightward movement of the valve spool 85 being limited by the piston 93 in abutting relation with the shoulder 94 formed by the bores 83 and 84. Leftward movement of the valve spool 85 is limited by the piston 93 abutting the cover 91.

The casing 82 of the pressure actuated bypass valve 43 is provided with a pair of annular grooves 95 and 96 as shown in FIGURE 1. The annular groove 96 communicates through conduit 97 with the high pressure manifold (FIGURE 1A) which in turn communicates with the high pressure side of the working circuit of the transmission 10. Annular groove 95 communicates, through conduit 98 with the oil transfer manifold (FIGURE 1A), and conduit 99 to the low pressure manifold which low pressure manifold in turn communicates with the low pressure side of the working circuit of the transmission 10.

For purposes herein the term "working circuit" means the operative hydraulic interconnection between the power pump 13 and power motor 14 of the transmission 10 and includes a high pressure side and a low pressure side which is the working fluid pressure differential required to transmit power as is conventionally known.

Referring back to FIGURE 1 the conduit 100 is a drain conduit preferably leading to the sump or reservoir supplying the charge pump P with inlet hydraulic fluid. The purpose of the drain conduit 100 is to vent the space immediately to the right of the piston 93 in order to avoid any pressure or vacuum (or accumulation of hydraulic fluid through leakage) in said space.

From the above it will be apparent that when the lever 66 is in either the forward direction range or the reverse direction range, the chamber 92 of the pressure actuated by-pass valve 43 will be pressurized through conduit 81 leading from the selector valve 42 and the valve spool 85 will assume its extreme rightward position as shown in FIGURE 1. In this position the land 86 registers with the annular groove 95 and thus the fluid at high pressure from the high pressure side of the transmission's working circuit in conduit 97 does not communicate with the low pressure side of the working circuit through conduit 98. Now, if the lever 66 is moved into the neutral range, the selector valve 42 discharges the fluid in chamber 92 and the spring 90 moves the valve spool 85 to its extreme leftward position. In the leftward position the circumferential groove 88 registers with both annular grooves 95 and 96 and thus the high pressure side of the working circuit in conduit 97 communicates directly with the low pressure side in conduit 98 thus short circuiting the working circuit. The transmission 10 therefore cannot deliver power from the input shaft 11 to the output shaft 12 irrespective of the angular displacements of swash plates 17 and 23. It will therefore become apparent that the transmission 10 may be shifted to neutral speed ratio almost instantaneously.

When the control lever 66 is in the forward direction range, the chambers 89 and 92 of the pressure actuated by-pass valve 43 are both charged with fluid under pressure from the selector valve 42 through conduits 80 and 81 respectively. Fluid pressure in the chamber 89 acts on the valve spool 85 along with the spring 90 to urge it leftwardly. However the area of piston 93 in chamber 92 is considerably greater than the cross-sectional area of the bore 83 in chamber 89 and therefore even though the fluid pressure in chamber 92 is equal to the fluid pressure in chamber 89, the piston 93 will overcome the combined forces of the fluid pressure in chamber 89 and spring 90 and therefore the valve spool 85 moves to the rightward position illustrated in FIGURE 1. When the control lever 66 is in the reverse direction range, the chamber 92 is charged with fluid pressure from the selector valve 42 but the chamber 89 is communicatively connected to drain as is evident from the previously described operation of the selector valve 42. Summarizing, the chamber 92 is charged with fluid under pressure from the selector valve 42 when the control lever 66 is in either the forward direction range or the reverse direction range and is in drain connection in the neutral range. The chamber 89 is charged with fluid pressure from the selector valve 42 only when the control lever 66 is in the forward direction range, the chamber 89 being connected to drain when the lever 66 is either the neutral range or reverse direction range. The purpose of the above described chambers 89 and 92 will now be described.

It is well known in the art of hydromechanical transmissions that in order to obtain a given torque ratio in reverse direction operation as compared with the same torque ratio in forward direction the hydraulic pressure in the high pressure side of the working circuit is of a considerably higher order. For example, in order to obtain a given torque ratio in the forward direction may only require a hydraulic pressure of 3500 p.s.i. on the high pressure side of the working circuit whereas if the swash plates are correspondingly shifted to obtain the same torque ratio in the reverse direction the hydraulic pressure may well be in the order of 5500 p.s.i. on the high pressure side of the working circuit. Thus in order to provide a means for equalizing the maximum torque output on the transmission's output shaft for operation in the forward direction as well as in the reverse direction a two-value pressure relief means for imposing maximum pressure in the working circuit is necessary. Such pressure relief means must function to limit the maximum pressure in the working circuit during reverse direction operation at a higher pressure value and limits said maximum pressure to a lower pressure value during forward direction operation. The pressure actuated by-pass valve 43 also serves this secondary function (i.e. two value pressure relief means) which will now be described.

Referring now to FIGURE 1 it will be seen that the valve spool 85 of the pressure actuated bypass valve 43 is provided with a cylindrically shaped internal chamber shown in dotted lines at 101. Longitudinally disposed within the internal chamber 101 in slidable relation with the valve spool 85 is a piston pin 102. The rightward end of the piston pin 102 is always in abutting relation with the casing 82 within chamber 89. If desired, the piston pin 102 may be rigidly connected to the casing 82. The leftward end portion of the piston pin 102 extends slidably into the internal chamber 101. Now the internal chamber 101 communicates with circumferential groove 88 through a transverse passage 103 as shown. Thus the fluid pressure in the internal chamber 101 is the same as the fluid pressure in circumferential groove 88 which is equal to the fluid pressure in the high pressure side of the working circuit of the transmission 10 as conducted through conduit 97.

Now it will be appreciated that fluid pressure in the internal chamber 101 acts on the leftward end portion of the piston pin 102. However, since the piston pin 102 is in abutting relation with the casing 82, it obviously cannot move in the rightward direction. Hence, the reaction force of the fluid under pressure in the internal chamber 101 urges the valve spool 85 leftwardly against the pressure in chamber 92. When the lever 66 is in the reverse direction range, the chamber 89 is connected to drain, as stated above, the valve spool 85 will begin to move leftwardly if the pressure in conduit 97 exceeds a predetermined value (e.g. 5500 p.s.i.) wherein the combined forces of fluid pressure exerted against the piston pin 102 and the pressure of the spring 90 overcome the fluid force exerted by the pressure in chamber 92 against the piston 93. As the valve spool 85 moves leftwardly, the land 86 throttlingly moves out of registry with respect to annular groove 95 which permits fluid in the high pressure conduit 97 to bleed into the low pressure conduit 98 thus limiting the maxium pressure in the conduit 97 during reverse direction operation of the transmission 10.

Now, if the control lever 66 is positioned in the forward direction range, the chamber 89 becomes charged with fluid pressure (e.g. 80 p.s.i.) the fluid pressure in conduit 97 necessary to move the valve spool 85 leftwardly is of a lower order because of the fluid pressure force in chamber 89. Thus the valve spool 85 will move to by-pass fluid from conduit 98 when the pressure in conduit 97 is of a lower order (e.g. 3500 p.s.i.).

From the above it will be apparent that by careful selection of the characteristics of the control pressure regulator 41, selector valve 42, and the pressure actuated by-pass valve 43 to match the characteristics of the transmission 10, the maximum torque of the output shaft 12 for operation in either the forward direction or reverse direction is the same. Obviously, the maximum pressure limitation (i.e. reverse direction) for the conduit 97 as above described should not exceed the safe maximum permissible pressure in the high pressure side of the transmission's working circuit as otherwise damage may result.

Up to this point means have been described for short-circuiting the high and low pressure sides of the working circuit of a hydraulic transmission when the operating control lever 66 is in the neutral range, and also limiting the maximum pressure in the high pressure side of the transmission's working circuit to a higher or first pressure value when the lever 66 is in the reverse direction range and to a lower or second pressure value when the lever 66 is in the forward direction range to equalize the maximum torque delivered by the transmission's output shaft during operation in either forward or reverse direction. Means will now be described for coordinately controlling the pump swash plate signal pressure in conduit 36 and the motor swash plate signal pressure in conduit 37 whereby the angular displacements of both pump and motor swash plates are controlled coordinately so that the transmission's speed ratio corresponds with the position of the control lever 66 of FIGURE 1.

The motor and pump signal pressure regulators 39 and 40 conveniently employ a common casing 104. Since the construction of the pressure regulator 39 is identical with that of regulator 40, only the regulator 40 will be described in detail and the corresponding parts of regulator 39 will bear the same numerals, except primed, as the parts for regulator 40.

In FIGURE 1 the regulator 40 includes a longitudinal bore 105 in the casing 104. Disposed slidably in the bore 105 is a plunger or cam follower element 106 having the leftward end portion projecting from the casing 104. In the rightward portion of the bore 105, in slidable relation, is a valve spool indicated generally at 107. The casing 104 is provided with longitudinally spaced annular grooves 108, 109 and 110.

The valve spool 107 includes lands 111 and 112 separated by a circumferential groove 113 as shown. The valve spool 107 is provided with a small passage, shown in dotted lines at 114 communicatively connecting the circumferential groove 113 with a chamber 115 formed by the valve spool 107 and casing 104. Thus it will be apparent that the fluid pressure in the chamber 115 equalizes itself with the fluid pressure in the circumferential groove 113 through communicating passage 114. It will also be apparent that fluid pressure in the chamber 115 hydraulically acts on the valve spool 107 to urge it in a leftward direction as viewed in FIGURE 1.

Disposed between the cam follower 106 and the leftward end of the valve spool 107 within the bore 105 is a compression spring 116. The spring 116 provides a yieldable means whereby the valve spool 107 may be moved leftwardly in respect to a selected position of the cam follower 106.

Hydraulic fluid under pressure from the charge pump P is communicated to the conduit 117 through the oil transfer manifold of the transmission 10 as is evident from FIGURES 1 and 1A. The inlet conduit 117 communicates with annular groove 110. The annular groove 110 communicates with annular groove 110' of regulator 39 through connecting passage 118 in the casing 104. Annular groove 110' communicatively connects with conduit 45 leading to the control pressure regulator 41 as previously described. Thus it will be understood that conduit 117 in communication with the charge pump P is always in communication with the conduit 45.

Annular groove 108' is communicatively connected to annular groove 108 through connecting passage 119 and also annular groove 108 communicates through conduit 120 to drain preferably to the same sump from which the charge pump P draws its intake hydraulic fluid. The longitudinal groove or channel 127 in casing 104 merely communicates the spring chamber 128 with the drain conduit 120 as a vent passage.

As seen in FIGURES 1 and 1A, the annular groove 109 communicatively connects with the conduit 36 leading to the power pump swash plate control valve 30. As explained previously, the static hydraulic pressure value in the conduit 36 determines the angular displacement of the pump swash plate 17. In short, as the pressure in the conduit 36 increases, the pump swash plate 17 progressively rotates about its pivot 18 in the clockwise direction as viewed in FIGURE 1A.

The annular groove 109' of the regulator 39 communicatively connects with the conduit 37 leading to the power motor swash plate control valve 31. The static hydraulic pressure value in the conduit 37 determines the angular displacement of the motor swash plate 23. As in the case of the pump swash plate 17, when the pressure in the conduit 37 increases, the motor swash plate 23 progressively pivots about its pivot 24 in the clockwise direction as viewed in FIGURE 1A.

As illustrated in FIGURE 1, the position of the valve spool 107 is in equilibrium condition whereby the pressure of the spring 116 urging the valve spool 107 rightwardly is balanced by the hydraulic force resulting from the fluid pressure in the chamber 115 acting hydraulically against the valve spool 107 urging it leftwardly. In this condition the land 111 registers with the annular groove 108 and the land 112 registers with annular groove 110. In the event that a pressure drop occurs in conduit 36, such as might occur through leakage, the pressure in the chamber 115 also drops and thus the force of the spring 116 moves the valve spool 107 rightwardly wherein the land 112 uncovers annular groove 110. This permits fluid under pressure from the charge pump P in conduit 117 to enter the circumferential groove 113 until equilibrium is again established. From this it is clear that for a selected position of the cam follower 106 in the bore 105 the static pressure in conduit 36 remains substantially constant. However, it is equally apparent that if the position of the cam follower is selectively changed, the force of the spring 116 against the valve spool 107 is correspondingly changed. At this point it will be observed that the regulators 39 and 40 function in the same manner as that of the previously described control pressure regulator 41 except that the output pressures in conduits 36 and 37 are selectively variable by shifting the positions of the cam followers 106 and 106' whereas in the case of the control pressure regulator 41 the output pressure in conduit 44 is constant at a fixed predetermined value.

Now in order to position selectively the cam followers 106 and 106' in a predetermined coordinated relation, a pair of cam elements 121 and 121' are mounted on and constrained for rotation with a common shaft 122. Secured rigidly to one end of the shaft 122 is a crank arm 123 as shown in FIGURE 1. Pivotally connected at 124 to the crank arm 123 is a link member 125 which in turn is adjustably connected to one end of a rod 126. The other end of the rod 126 is connected pivotally at 65 to the operating control lever 166. The link member 125 is adjustable with respect to the rod 126 in a conventional manner so that the distance between pivots 65 and 124 can be adjusted.

Owing to the arrangement of the linkage between the operating control lever 66 and the cam shaft 122, it will be apparent that the rotation of the cam shaft 122 is limited to less than 180°. Consequently, the degree of rotation of the shaft 122 and cams 121 and 121' is limited by the arcuate range of travel of the operating control lever 66. From the above description of the signal pressure regulators 39 and 40 it will be apparent that by careful selection of the contours of the cams 121 and 121' the positions of the cam followers 106 and 106' can be regulated relatively so that the static pressure values in conduits 36 and 37 are coordinated in a predetermined pattern fixed by the cams 121 and 121'. Since the angular displacements of the swash plates 17 and 23 are determined by the pressure values in conduits 36 and 37, respectively, it can be seen that the speed ratio of the transmission 10 can be coordinated as a function of the position of the operating control lever 66.

Figure 7:
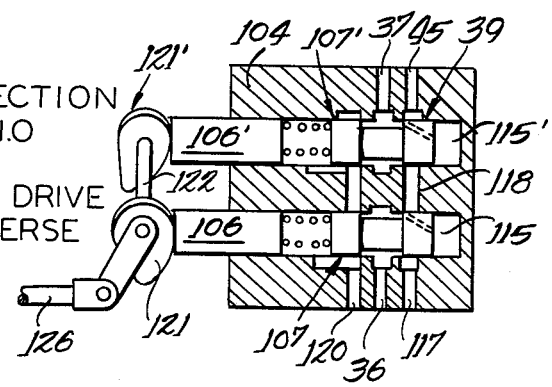
Figure 8:
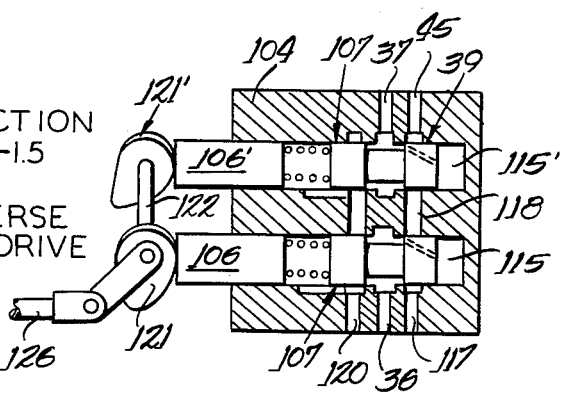

Referring now to FIGURES 2 through 8, the positions of the valve spools 107 and 107' are shown in equilibrium condition for various speed ratios of the transmission 10. However, it will be seen that the cams 121 and 121' and their respective cam followers 106 and 106' positioned differently according to the selected speed ratio of the transmission 10 as effected by the shifting of the operating control lever 66. For different speed ratios of the transmission 10 the pressure of the spring 116 bearing against the valve spool 107 and the pressure of the spring 116' bearing against the valve spool 107' are correspondingly different. Thus in the case of FIGURE 2 the cam follower 106 is positioned such that the force of the spring 116 is sufficient to elevate the pressure in conduit 36 to the level required to position the power pump swash plate 17 to the vertical position whereby the displacement of the power pump is zero and hence no power is transmitted from the input shaft 11 to the output shaft 12.

If the lever 66 is shifted to forward direction (speed ratio +0.5) the cams 121 and 121' shift the cam followers 106, 106' to the positions shown in FIGURE 3 whereby the output shaft 12 rotates at one-half the speed of the input shaft 11. FIGURE 4 illustrates the positions of the cams 121 and 121' and cam followers 106 and 106' wherein the pump swash plate 17 is inclined but the motor swash plate 23 is in the vertical position and thus the output shaft 12 rotates in the forward direction at the same speed as that of the input shaft 11 (direct forward drive).

FIGURES 5 to 8 illustrate positions of cams 121, 121' and cam followers 106, 106' for other positions of the operating control lever 66 which are all clearly evident from the foregoing description and the drawing.

From the above it will be seen that the control system of this invention provides a simple operator control means for a hydromechanical power transmission whereby the operator may obtain an infinite speed ratio of overdrive forward direction, forward underdrive, underdrive reverse direction and overdrive reverse direction. In addition a positive neutral is obtainable which short circuits the working circuit of the transmission which allows the output shaft to coast.

Having thus described an embodiment of the invention, it can now be seen that the objects of the invention have been fully achieved and it must be understood that changes and modifications may be made which do not depart from the spirit of the invention as disclosed nor from the scope thereof as defined in the appended claims.

What is claimed is:

1. For an infinitely variable speed ratio hydraulic power transmission having a hydraulic power pump unit driven by a power input shaft and a hydraulic power motor unit drivingly connected to a power output shaft, said units being hydraulically interconnected through a hydraulic working circuit having a high pressure side and a low pressure side operative for transmitting power hydraulically from said input shaft to said output shaft, a hydraulic ram including a first source of energizing fluid pressure therefor positioned to vary the fluid displacement of at least one of said units, and a fluid pressure actuated displacement control valve responsive to a fluid pressure signal source operatively connected thereto whereby the speed ratio of said transmission is a function of the value of said fluid pressure signal source; a control system for controlling selectively the value of said fluid pressure signal source comprising a variable signal pressure regulator communicatingly connected to said displacement control valve and a second source of fluid under pressure in operative relation, and means for adjusting said regulator for selectively controlling said signal pressure whereby the speed ratio of said transmission is selectively determined by said regulator.

2. For an infinitely variable speed ratio hydraulic power transmission having a hydraulic power pump unit driven by a power input shaft and a hydraulic power motor unit drivingly connected to a power output shaft, said units being hydraulically interconnected through a hydraulic working circuit having a high pressure side and a low pressure side for transmitting power hydraulically from said input shaft to said output shaft, a hydraulic ram including a first source of energizing fluid pressure therefor positioned to vary the fluid displacement of at least one of said units, and a fluid pressure actuated displacement control valve responsive to a fluid pressure signal operatively connected thereto whereby the speed ratio of said transmission is a function of the value of said fluid signal pressure; a control system for controlling selectively the speed ratio of said transmission comprising, in combination, a variable signal pressure regulator communicatively connected to said displacement control valve and a second source of fluid under pressure in operative relation, means connected to said regulator for selectively controlling said signal pressure for controlling the speed ratio of said transmission selectively, and means for interconnecting said high pressure side with said low pressure side of said working circuit in by-pass relation when said regulator is set for a signal pressure value corresponding to zero speed ratio of said transmission whereby no power is transmitted from said input shaft to said output shaft.

3. For an infinitely variable speed ratio hydraulic power transmission having a hydraulic power pump unit driven by a power input shaft and a hydraulic power motor unit drivingly connected to a power output shaft, said units being hydraulically interconnected through a hydraulic working circuit having a high pressure side and a low pressure side for transmitting power hydraulically from said input shaft to said output shaft, a hydraulic ram including a first source of energizing fluid pressure therefor positioned to vary the fluid displacement of at least one of said units, and a fluid pressure actuated displacement control valve responsive to a source of fluid signal pressure operatively connected thereto whereby the speed ratio of said transmission is a function of the value of said pressure signal; a control system for controlling selectively the speed ratio of said transmission comprising, in combination, a variable signal pressure regulator communicatively connected to said displacement control valve and a second source of fluid under pressure in operative relation, a lever connected to said regulator for selectively controlling said signal pressure, a pressure actuated by-pass valve actuatable for interconnecting in by-pass relation said high pressure side with said low pressure side of said working circuit to disconnect drive relation from said input shaft to said output shaft, and a selector valve operatively connected to said lever, said selector valve being communicatively connected to said pressure actuated by-pass valve whereby said selector valve controls said by-pass valve to interconnect in by-pass relation said high pressure side with said low pressure side when said lever is moved to a position corresponding to zero speed ratio of said transmission.

4. The control system for an infinitely variable speed ratio hydraulic power transmission according to claim 3 wherein said pressure actuated by-pass valve is provided with pressure relief means whereby said by-pass valve is actuated to bypass fluid from said high pressure side to said low pressure side of said working circuit when the pressure in the said high pressure side reaches a predetermined maximum pressure value for limiting the maximum torque transmitted from said input shaft to said output shaft at a selected speed ratio of said transmission.

5. The control system for an infinitely variable speed ratio hydraulic power transmission according to claim 3 wherein said pressure actuated by-pass valve is provided with pressure relief means whereby said by-pass valve is actuated to bypass fluid from said high pressure side to said low pressure side of said working circuit when the pressure in the said high pressure side reaches a first predetermined maximum pressure value during operation of said transmission in the forward direction and alternately said by-pass valve is actuated to bypass fluid from said high pressure side to said low pressure side of said working circuit when said high pressure side reaches a second predetermined maximum pressure value during operation of said transmission in the reverse direction for limiting the maximum torque transmitted from said input shaft to said output shaft at a selected speed ratio of said transmission.

6. The control system for an infinitely variable speed ratio hydraulic power transmission according to claim 5 wherein the relation of said first predetermined maximum pressure value with respect to said second predetermined maximum pressure value is such that the maximum torque limit of said output shaft during operation of said transmission in the forward direction is substantially equal to the maximum torque limit of said output shaft during operation of said transmission in the reverse direction at a corresponding speed ratio.

7. For an infinitely variable speed ratio hydraulic power transmission having a variable displacement power pump unit driven by a power input shaft and a variable displacement hydraulic power motor unit drivingly connected to a power output shaft, said units being hydraulically interconnected through a hydraulic working circuit having a high pressure side and a low pressure side operative for transmitting power hydraulically from said input shaft to said output shaft, a first hydraulic ram positioned to vary the fluid displacement of said pump unit and a second hydraulic ram positioned to vary the fluid displacement of said motor unit, a source of fluid pressure for energizing said rams, a first fluid pressure actuated displacement control valve for controlling said first hydraulic ram responsive to a first fluid pressure signal source operatively connected thereto and a second fluid pressure actuated displacement control valve for controlling said second hydraulic ram responsive to a second fluid pressure signal source operatively connected thereto whereby the speed ratio of said transmission is a function of the pressure values of said first and second fluid pressure signal sources; a control system for controlling selectively the respective values of each of said fluid pressure signal sources comprising a first signal pressure regulator communicatively connected to said first displacement control valve and a second signal pressure regulator communicatively connected to said second displacement control valve, and means for adjusting each of said regulators for selectively controlling the signal pressure value of each of said regulators whereby the speed ratio of said transmission is selectively determined by said regulators.

8. For an infinitely variable speed ratio hydraulic power transmission having a variable displacement power pump unit driven by a power input shaft and a variable displacement hydraulic power motor unit drivingly connected to a power output shaft, said units being hydraulically interconnected through a hydraulic working circuit having a high pressure side and a low pressure side operative for transmitting power hydraulically from said input shaft to said output shaft, a first hydraulic ram positioned to vary the fluid displacement of said pump unit and a second hydraulic ram positioned to vary the fluid displacement of said motor unit, a source of fluid pressure for energizing said rams, a first fluid pressure actuated displacement control valve for controlling said first hydraulic ram responsive to a first fluid pressure signal source operatively connected thereto and a second fluid pressure actuated displacement control valve for controlling said second hydraulic ram responsive to a second fluid pressure signal source operatively connected thereto whereby the speed ratio of said transmission is a function of the pressure values of said first and second fluid pressure signal sources; a control system for controlling selectively the speed ratio of said transmission comprising, in combination, a first signal pressure regulator communicatively connected to said first displacement control valve and a second signal pressure regulator communicatively connected to said second displacement control valve, means connected to said regulators for selectively controlling the signal pressure value of each of said regulators for controlling the speed ratio of said transmission, and means for interconnecting said high pressure side with said low pressure side of said working circuit in by-pass relation when said regulators are set for signal pressure values corresponding to zero speed ratio of said transmission whereby no power is transmitted from said input shaft to said output shaft.

9. For an infinitely variable speed ratio hydraulic power transmission having a variable displacement power pump unit driven by a power input shaft and a variable displacement hydraulic power motor unit drivingly connected to a power output shaft, said units being hydraulically interconnected through a hydraulic working circuit having a high pressure side and a low pressure side operative for transmitting power hydraulically from said input shaft to said output shaft, a first hydraulic ram positioned to vary the fluid displacement of said pump unit and a second hydraulic ram positioned to vary the fluid displacement of said motor unit, a source of fluid pressure for energizing said rams, a first fluid pressure actuated displacement control valve for controlling said first hydraulic ram responsive to a first fluid pressure signal source operatively connected thereto and a second fluid pressure actuated displacement control valve for controlling said second hydraulic ram responsive to a second fluid pressure signal source operatively connected thereto whereby the speed ratio of said transmission is a function of the pressure values of said first and second fluid pressure signal sources; a control system for controlling selectively the speed ratio of said transmission comprising, in combination, a first variable signal pressure regulator communicatively connected to said first displacement control valve and a second variable signal pressure regulator communicatively connected to said second displacement control valve, a lever connected to said regulators in operative relation for controlling the pressure values of said first and second signal pressures, a pressure actuated by-pass valve actuatable for interconnecting in by-pass relation said high pressure side with said low pressure side of said working circuit to disconnect drive relation from said input shaft to said output shaft, and a selector valve operatively connected to said lever, said selector valve being communicatively connected to said pressure actuated by-pass valve whereby said selector valve controls said by-pass valve to interconnect in by-pass relation said high pressure side with said low pressure side when said lever is moved to a position corresponding to zero speed ratio of said transmission.

10. The control system for an infinitely variable speed ratio hydraulic power transmission according to claim 9 wherein said pressure actuated by-pass valve is provided with pressure relief means whereby said by-pass valve is actuated to by pass fluid from said high pressure side to said low pressure side when said high pressure side reaches a predetermined maximum pressure value for limiting the maximum torque transmitted from said input shaft to said output shaft at a selected speed ratio of said transmission.

11. The control system for an infinitely variable speed ratio hydraulic power transmission according to claim 9 wherein said pressure actuated by-pass valve is provided with pressure relief means whereby said by-pass valve is actuated to by pass fluid from said high pressure side to said low pressure side of said working circuit when the pressure in the said high pressure side reaches a first predetermined maximum pressure value during operation of said transmission in the forward direction and alternately said by-pass valve is actuated to by pass fluid from said high pressure side to said low pressure side of said working circuit when said high pressure side reaches a second predetermined pressure value during operation of said transmission in the reverse direction for limiting the maximum torque transmitted from said input shaft to said output shaft at a selected speed ratio of said transmission.

12. The control system for an infinitely variable speed ratio hydraulic power transmission according to claim 11 wherein the relation of said first predetermined maximum pressure value with respect to said second predetermined maximum pressure value is such that the maximum torque limit of said output shaft during operation of said transmission in the forward direction is substantially equal to the maximum torque limit of said output shaft during operation of said transmission in the reverse direction at a corresponding speed ratio.

References Cited by the Examiner
UNITED STATES PATENTS

| | | | |
|---|---|---|---|
| 2,976,685 | 3/61 | Thoma et al. | 60—53 |
| 3,060,953 | 10/62 | Harbidge | 137—101 |
| 3,139,908 | 7/64 | Strader | 137—625.48 |
| 3,143,858 | 8/64 | Roeske | 60—53 |

SAMUEL LEVINE, Primary Examiner.
EDGAR W. GEOGHEGAN, Examiner.